United States Patent
Zhou (12)

(10) Patent No.: US 7,656,281 B2
(45) Date of Patent: Feb. 2, 2010

(54) EXTERNAL AIR-FLOW-THROUGH VALVE STEM MOUNTED TIRE PRESSURE MONITORING APPARATUS

(76) Inventor: Joe Huayue Zhou, 3323 Lotus Dr., Hacienda Heights, CA (US) 91745

( * ) Notice: Subject to any disclaimer, the term of this patent is extended or adjusted under 35 U.S.C. 154(b) by 391 days.

(21) Appl. No.: 11/749,161

(22) Filed: May 16, 2007

(65) Prior Publication Data

US 2008/0284576 A1    Nov. 20, 2008

(51) Int. Cl.
*B60C 23/02* (2006.01)
(52) U.S. Cl. .................................... 340/442
(58) Field of Classification Search ......... 340/442–448; 73/146.2–146.6
See application file for complete search history.

(56) References Cited

U.S. PATENT DOCUMENTS

| | | | |
|---|---|---|---|
| 6,535,116 B1 * | 3/2003 | Zhou | 340/447 |
| 6,799,455 B1 * | 10/2004 | Neefeldt et al. | 73/146 |
| 6,993,962 B1 * | 2/2006 | Ko | 73/146.5 |

* cited by examiner

*Primary Examiner*—Jeffery Hofsass (57) ABSTRACT

A wireless tire pressure monitoring apparatus is adapted to install on a conventional tire valve stem. The apparatus includes capability of refilling air through the sensor built-in valve stem, without needing to remove the apparatus. The pressure monitoring apparatus further includes a locking device to secure the mounting of the apparatus on the tire valve stem, with the additional benefit of discouraging apparatus thieves.

8 Claims, 11 Drawing Sheets

External Air-Flow-Through Valve Stem Mounted
Sensor Module Assembly Drawing and Picture Figure 1  External Air-Flow-Through Valve Stem Mounted Sensor Installation Figure 2 External Air-Flow-Through Valve Stem Mounted Sensor Size and Assembly Pictures.

Figure 3  External Air-Flow-Through Valve Stem Mounted Tire Pressure Sensor Enclosure Drawings Fig. 4 External Air-Flow-Through Valve Stem Mounted Sensor Module Assembly Drawing and Picture Figure 5  External Air-Flow-Through Valve Stem Mounted Sesnor Module Assembly Drawing Figure 6 Sensor Module with Manual Signal Trigger Terminal Figure 7 External Air-Flow-Through Valve Stem Mounted Sensor Security Lock Figure 8  External Valve Stem Mounted Sensor Antenna Layout Figure 9 External Valve Stem Mounted Sensor PCB Figure 10 Sensor Module Schematic Figure11 Motor-Home Tire Pressure Monitoring System
With External Valve Stem Mounted Sensors

EXTERNAL AIR-FLOW-THROUGH VALVE STEM MOUNTED TIRE PRESSURE MONITORING APPARATUS

FIELD OF THE INVENTION

The invention relates to the field of external valve stem mounted tire pressure monitoring sensor with air flow through feature. Particularly, the invention relates to an apparatus of a miniature external valve stem mounted tire pressure sensor design that allows refilling tire air through the sensor built-in valve stem without needing to remove the sensor, and methods for constructing and operating the apparatus.

BACKGROUND OF THE INVENTION

Numerous innovations for tire pressure sensors have been provided in prior arts.

Pressure sensors have long been used to monitor tires for determining whether the tire was properly pressurized. Known methods for monitoring tire pressure included:

(a) A pressure sensor module installed inside the tire on the rim and secured by a steel mounting bend, and transmitted the pressure data by wireless RF signals to a monitor located in the driver cab of a vehicle. With this method, system installation and replacement are very inconvenient and labor intensive. The tire must be removed prior to and then remounted after sensor installation. The sensor might break if the band was fastened too tightly or be damaged by the tire bead during tire remounting. RF signal transmission would be blocked and weakened by the steel belts embedded inside the tire. The mounting bend might become loose and break.

(b) A pressure sensing and transmission device mounted on the inner end of a specially designed tire valve, and transmitted the pressure data wirelessly to a monitor. With this method, sensor installation or replacement also involved the inconvenient and labored manipulation of the tire. RF signal transmission would be blocked and weakened by the tire wall. Additionally, the inability of using conventional valves limits the application of this method to only a narrow range of wheel types that can fit with the specially designed sensor valves.

(c) A pressure sensing and transmission device mounted on the valve stem outside of the tire. The device measured tire pressure through the valve and transmitted pressure data wirelessly to a monitor. This method has the advantages of easy installation and good signal transmission. With this method, however, the user must remove the sensor to refill tire air and then reinstall the sensor back on the valve stem. In addition to the inconvenience, frequent sensor removal and reinstallation would damage the air seal and cause air leak, thereby creating a safety hazard for the user.

U.S. Pat. No. 4,804,808 issued to Dal Cero on Feb. 14, 1989 discloses a pressure-sensing device that senses low tire pressure and signals low pressure using a transmitter and a receiver.

U.S. Pat. No. 5,289,161 issued to Huang on Feb. 22, 1994 discloses a pressure gauge having a diaphragm that pushes a spring-loaded rod between two switch devices which, when the tire is not properly pressurized, will trigger the sending of an encoded RF signal to a receiver for generating alarms.

U.S. Pat. No. 5,694,111 issued to Huang on Dec. 2, 1997 discloses an encoder unit and a transmitter circuit for a tire pressure sensor device for generating encoded RF signals received by a receiver with a display unit.

U.S. Pat. No. 4,319,220 issued to Pappas on Mar. 9, 1982 discloses a system for monitoring tire pressure of the tires having respective transmitters communicating alarm signals to a receiver.

U.S. Pat. No. 5,001,457 issued to Wang on Mar. 19, 1991 teaches a cab mounted monitor having a graphic display for visually indicating under-pressurized tire, which is identified by encoded signals transmitted from respective tire pressure sensing transmitters to the cab mounted central receiver.

U.S. Pat. No. 6,535,116 issued to Joe Zhou on Mar. 18, 2003 discloses a pressure-sensing valve stem mount miniature sensor for a vehicle monitoring system.

U.S. Pat. No. 6,799,455 issued to Neefeldt, et al on Oct. 5, 2004 discloses a pressure-sensing valve mount device that includes an antenna extending through the valve passageway into the tire for transmitting RF signals.

U.S. Pat. No. 6,993,962 issued to Ko on Feb. 7, 2006 discloses a pressure-sensing valve mount device using a electrically conducting pinch pin for power supply when the device is screwed on the tire valve.

Typically, these systems teach tire valve mounted pressure sensors responsive to individual tire pressures for generating encoded signals transmitted to a receiver with graphic displays. However, these teachings do not address or not able to resolve many practical issues, as described below:

(i) Valve Stem Mounted Sensor with Air-flow-through Function

A tire valve-stem mounted pressure sensor must be easy and safe to use. Properly pressurized tires are utmost important for safe driving and for prolonging the life of tires. However prior systems generally must be removed for refilling tire air and, therefore, are very inconvenient for tire maintenance. In addition, frequent removal and reinstalling a sensor would damage its air seal and consequently cause air leak, thereby creating a safety hazard. It is technically very challenging to make a small external sensor that can support tire air refill without removing the sensor. Prior teachings generally do not present practical methods to make small external sensors with air-flow-through function.

(ii) Valve-stem Mounted Sensor with Security Lock

A valve-stem mounted pressure sensor is generally secured by screwing on the tire valve stem thread. Constant vibration of a moving vehicle might gradually loosen the grip of the sensor on the valve stem. The sensor also might be loosened and detached from the valve stem of a fast moving vehicle due to forces exerted by tire rotation and airflow. External sensor is easy to install and remove so sensor thief is a problem for the user. Prior teachings generally do not address methods for protecting the installed sensors.

(iii) External Sensor with Manual Signal Triggering Function

Tire monitoring system programming and services require learning the sensor measurement data from a stationary vehicle. A common practice of inducing an external sensor signal is by removing and then reinstalling the sensor. This method would potentially damage the air seal and cause air leaks. Prior teachings generally describe methods of using a magnet or low frequency (LF) signals to energize the sensor for producing a signal. These methods require additional electronic components and circuitry in the sensor and therefore would increase its size and weight; the methods also require extra hardware such as a magnet or a LF initiator for triggering the signals. External sensors must be small sized with a small battery so a manual signal triggering method without extra electronic components is very important and useful.

(iv) External Sensor Detects Motion without Motion Detecting Circuitry

Most tire monitoring sensors use battery to drive the electronics and must conserve power consumption for prolonging sensor life. Prior systems generally use motion detecting circuitry to detect vehicle motion for activating or increasing tire monitoring activities, and to decrease or cease monitoring when the vehicle is at rest. These methods require additional electronic components and therefore would increase size and weight to the sensor. Mechanical motion detectors require proper orientation to be effective, whereas solid state motion detectors have large power draw and easy to break. External sensors must have a small size with a small battery so a motion detection method without motion detecting circuitry taking up space and power draw is very important and useful.

SUMMARY OF THE INVENTION

A main object of the present invention is to provide a miniature external tire pressure monitoring sensor with air flow through feature, which can be mounted directly on a tire valve stem.

Another object of the invention is a method for securing the sensor module on the valve with a fastening device. The device provides secure mounting and anti-thief protection to the sensor.

Another object of the invention is a method for triggering sensor signal transmission manually without needing to apply a magnetic field or to apply low frequency or other RF trigger signals. It provides a simple and reliable sensor signal triggering method for tire monitoring system programming and services.

Another object of the invention is a method for a tire sensor to detect vehicle motion status without using electronic motion detection circuitry.

DETAILED DESCRIPTION OF THE INVENTION

Figure 1:
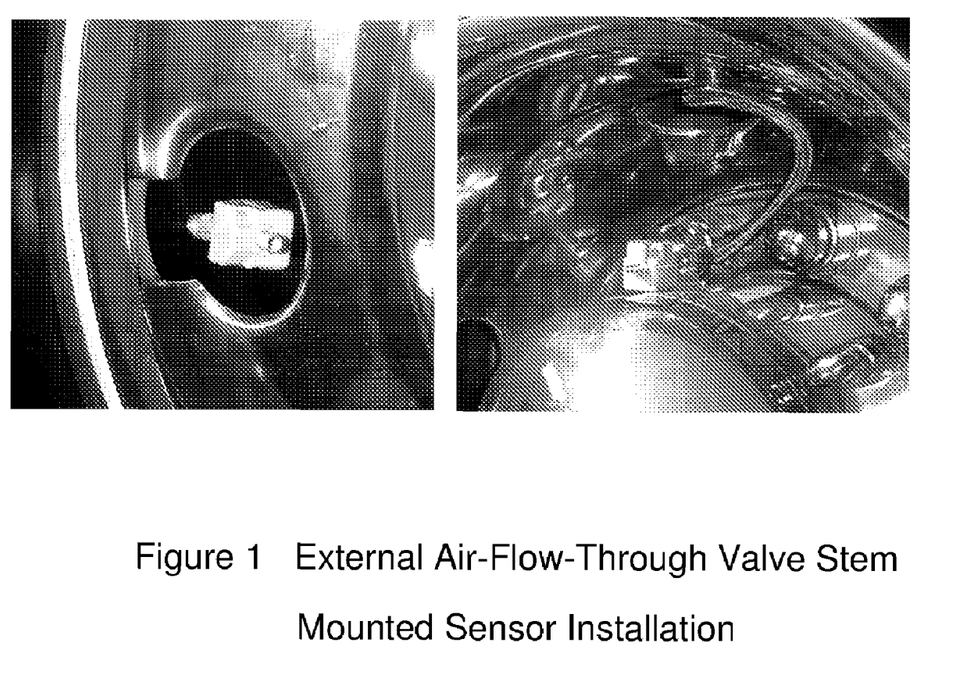
FIG. 1 is the external valve stem mounted tire pressure sensor installation.
Figure 2:
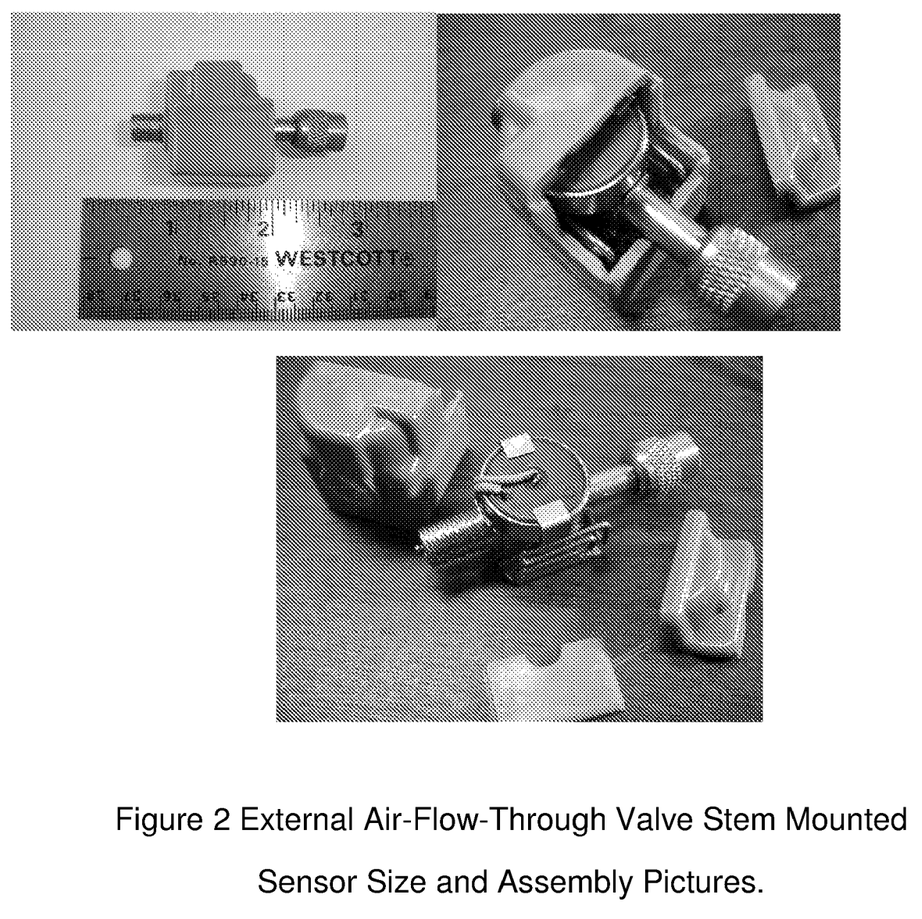
FIG. 2 is the external valve stem mounted tire pressure sensor module external and inside pictures.
Figure 3:
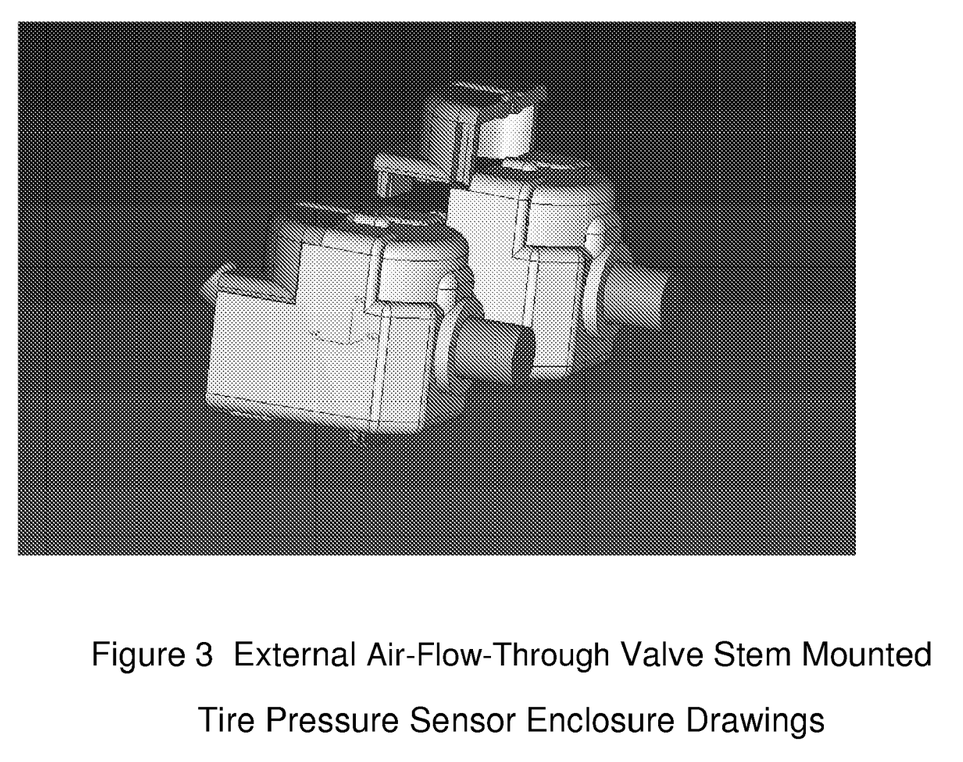
FIG. 3 is a sketch of tire sensor module housing.

An embodiment of the invention is described herein with references to the figures using reference designations as shown in the figures. The external flow-through valve stem mounted tire pressure sensor module installation, shown by respective picture representations in FIG. 1, showed in one picture the sensor being mounted directly on a motor-home tire valve, and in another picture the sensor being mounted on a valve extender; tire air can easily be filled and released through the sensor built-in valve stem. Pictures in FIG. 2 showed the sensor size and its construction respectively. The pictures showed that the sensor components are built around a valve stem, with the control circuitry PCB on one side, a battery on the opposite side, and a miniature antenna traversing across the remaining two sides. FIG. 3 showed a design drawing of the sensor housing.

Figure 4:
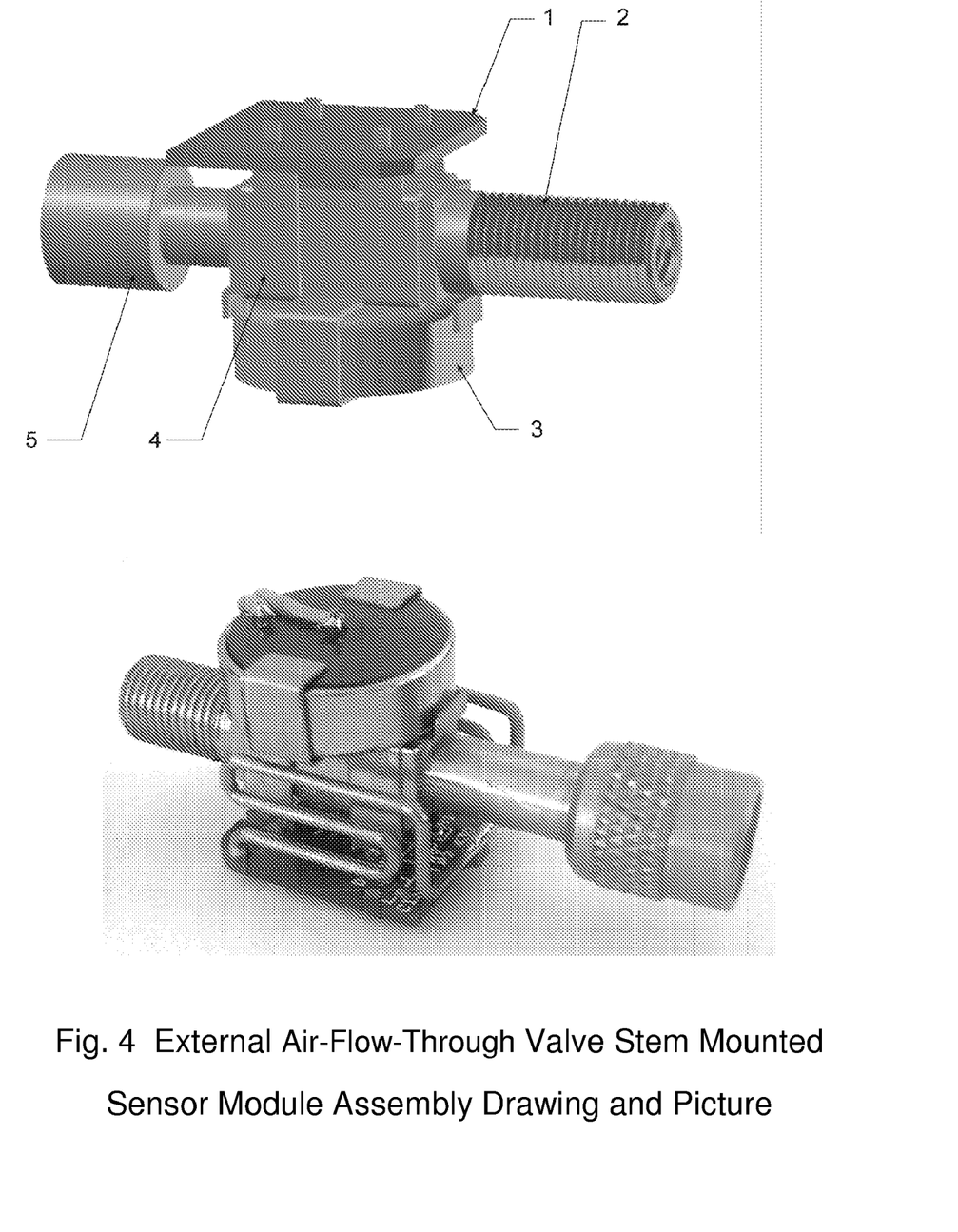
FIG. 4 shows a sketch of the tire pressure sensor and a clear view of the sensor without the housing.
Figure 5:
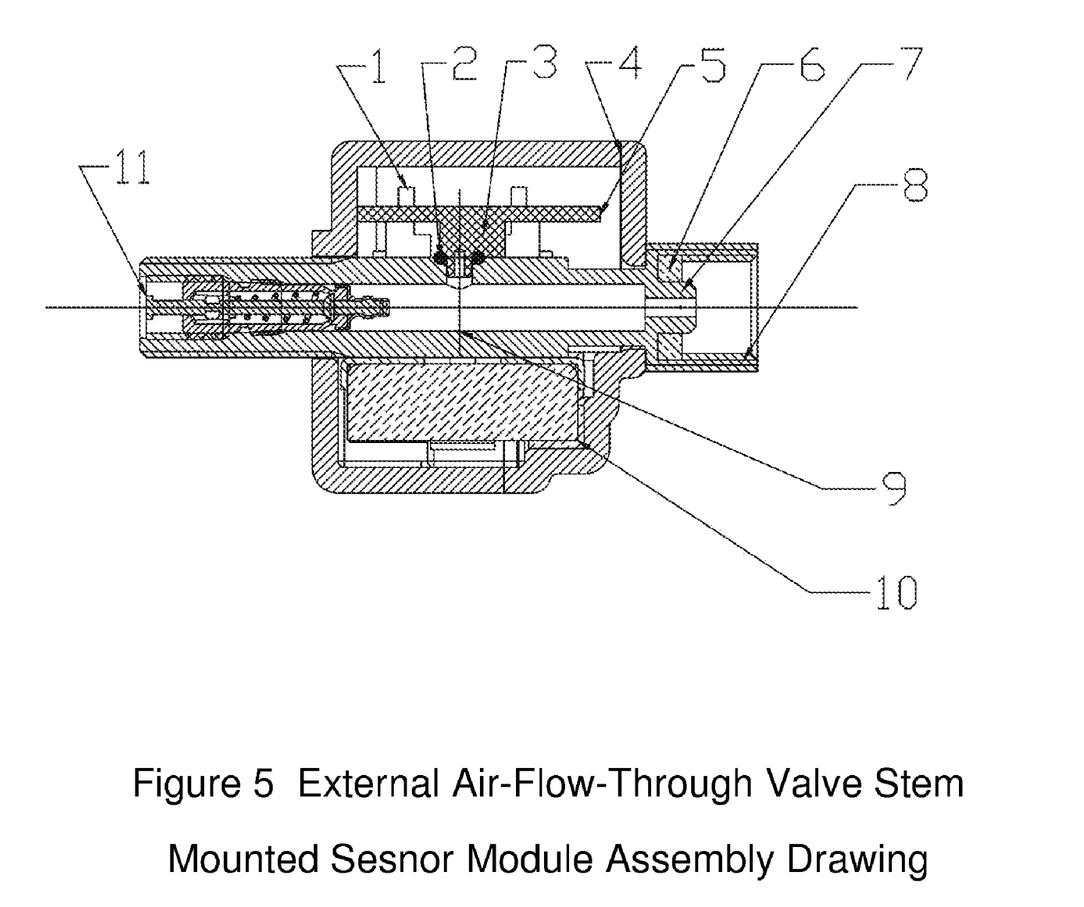
FIG. 5 is a sketch of the external tire pressure sensor module assembly.

FIG. 4 showed a design drawing and a picture of the sensor without the housing. In the design drawing No. 1 indicated the print circuit board, No. 2 and No. 5 pointed to the valve stem, No. 3 indicated the battery, and No. 4 pointed to the component fixture. The middle section of the valve stem is rectangular for providing a firm attachment platform for the component fixture. The holder held the print circuit board and electronics on one side, the battery on the other side, and an antenna looping through on the remaining two sides. This sensor construction method is able to achieve a very robust and space-saving assembly Now, referring to FIG. 5, figure shows a side view drawing of the external sensor assembly; housing 4 is rectangular, a piezo-resistive pressure sensing IC chip 3 is mounted on PCB 5, is pressed against air sealing O-ring 2, and is exposed to air through the hole; the PCB is held securely by fixture 1; valve connector has an O-ring 6 to prevent air leak after sensor installation, bulge 7 to press and open the tire valve for tire air flowing into the sensor built-in valve stem air passageway, inner thread 8 to support screwing onto the tire valve stem; center line 9 leads to the hole that enables air flow from passageway to the pressure sensor; battery 10 mounts on the side of the fixture opposite to the PCB for best utilization of sensor space, valve core 11 keeps air in the sensor passageway and the tire.

Figure 6:
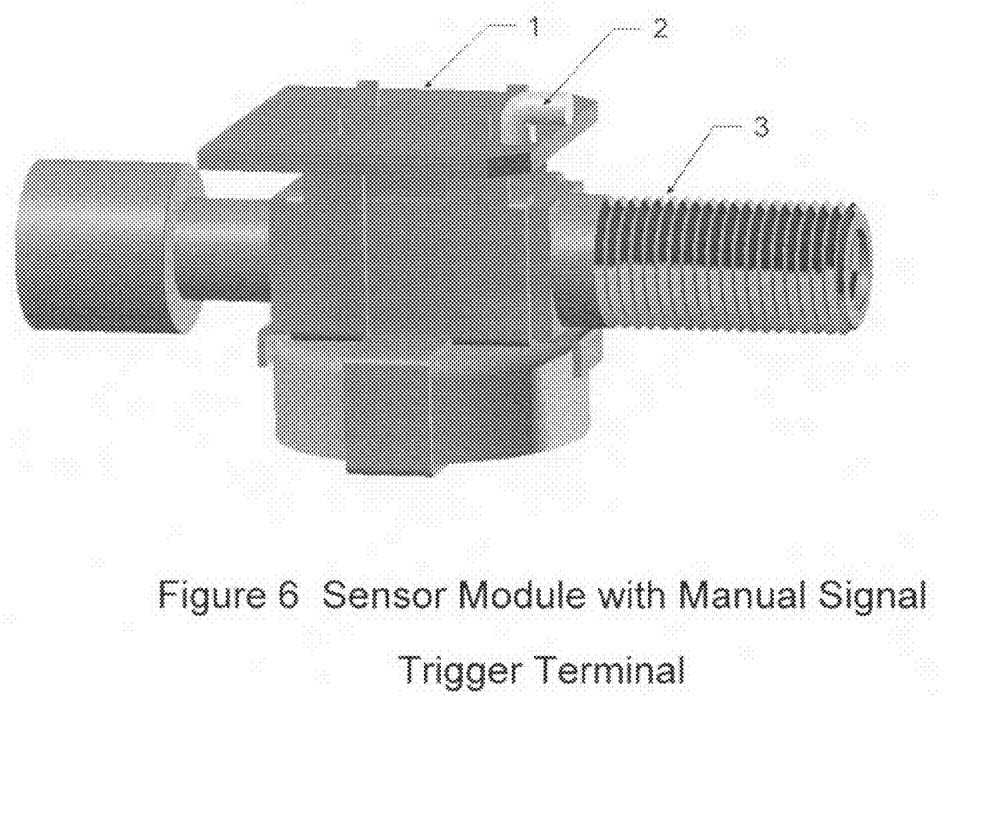
FIG. 6 is a sketch of the tire pressure sensor module manual signal trigger section.

Now, referring to FIG. 6, valve stem 3 is connected to PCB 1 ground and trigger terminal 2 is connected to one of the CPU input line. When trigger terminal 2 is shorted to valve stem 3 with a metal contact, it will pull down the voltage level at 2 and thereby triggering the sensor module to transmit a signal. To avoid false trigger by accidentally shorting terminal 2, the correct trigger should have more than one voltage state changes, such as shorting and then releasing.

Figure 7:
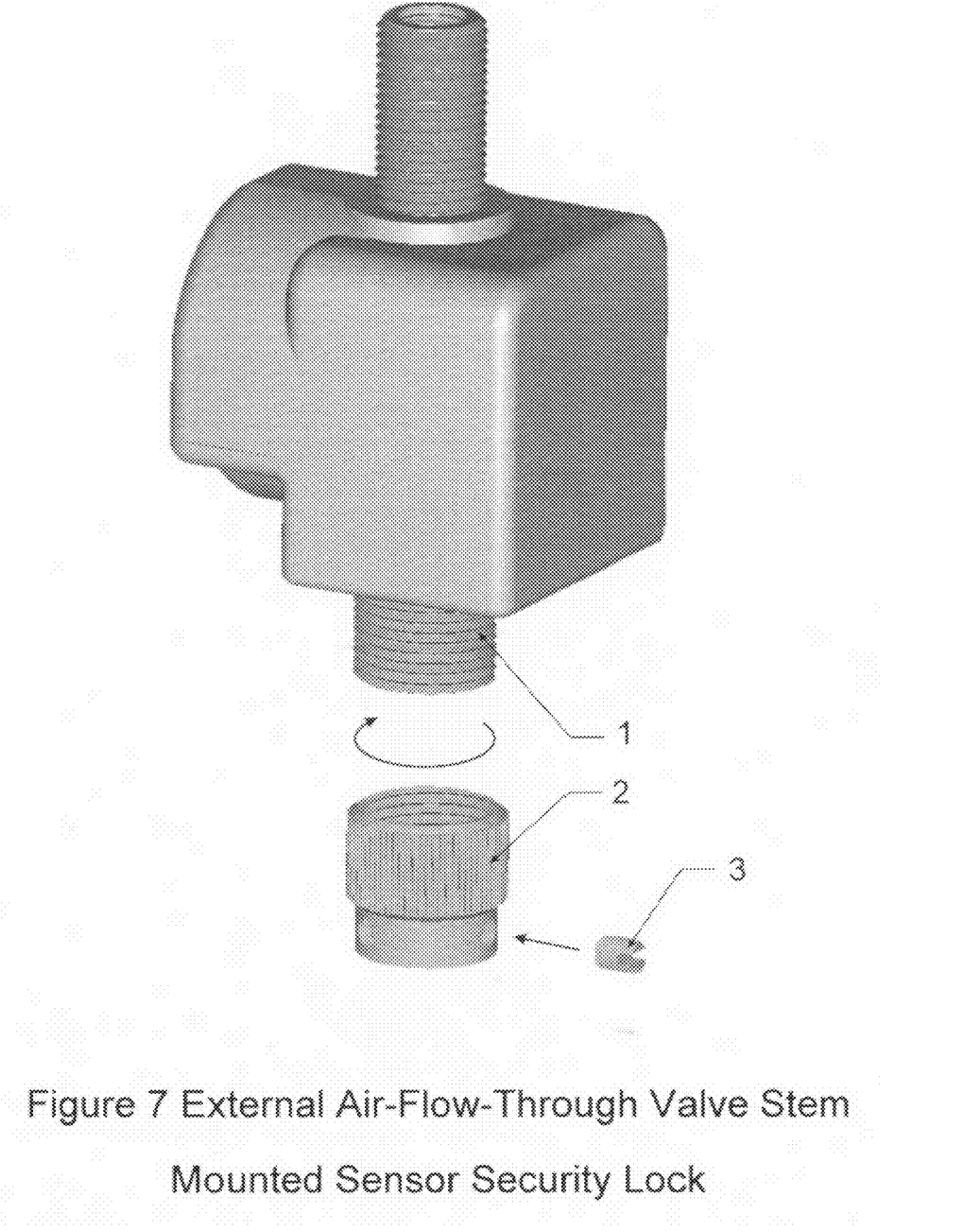
FIG. 7 is a sketch of the miniature tire pressure sensor module anti-thief lock.

FIG. 7 shows a sensor locking apparatus where, after the sensor is screwed on the tire valve stem, the sensor lock will keep sensor from moving. Sensor valve connector has external left-handed thread 1; sensor lock 2 has internal left-handed thread. To lock the sensor, first screw sensor lock 2 on sensor thread 1, next screw sensor and lock combination on tire valve stem, finally fasten one or more lock screw 3 until it tightly pressing the tire valve stem; the sensor is now secured. When someone attempts to take out the sensor without first using a tool to remove the lock, the counter-clockwise unscrewing action would tighten the engagement of the lock to the sensor, thereby preventing the sensor being easily removed.

Figure 8:
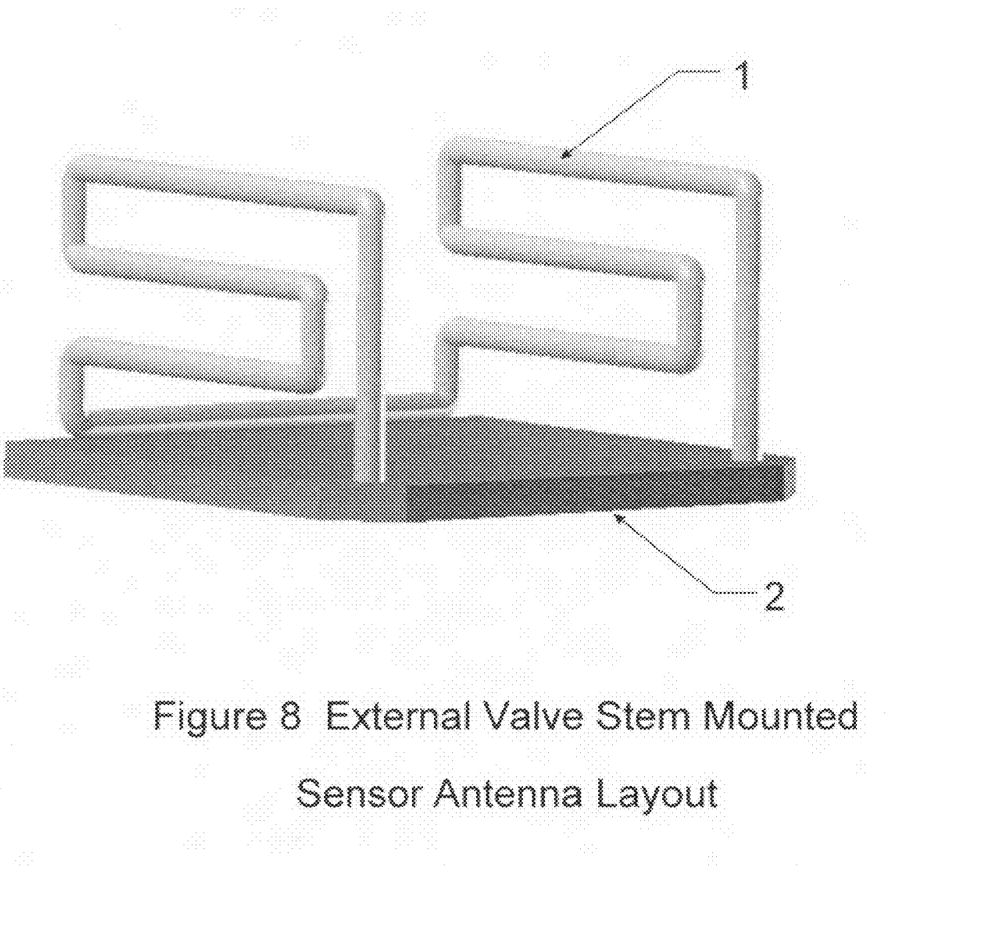
FIG. 8 is a sketch of the tire pressure sensor antenna.

FIG. 8 shows a method to layout a highly effective antenna in a small space. The idea is to only occupy narrow spaces on two sides of the PCB 2 and leave the middle section for other usage. Antenna 1—originating from one corner on PCB 2—traverses and loops along the PCB edge plane until achieving proper shape and length, next the antenna stays low to cross the PCB and reaches the opposite edge, where the antenna once again traverses and loops along the PCB edge plane until achieving proper shape and length and then finally terminates at the other corner of the PCB from the origination point. This antenna layout method can produce a high gain antenna using very little space and, therefore, is very useful in making miniature tire pressure monitoring sensors.

Figure 9:
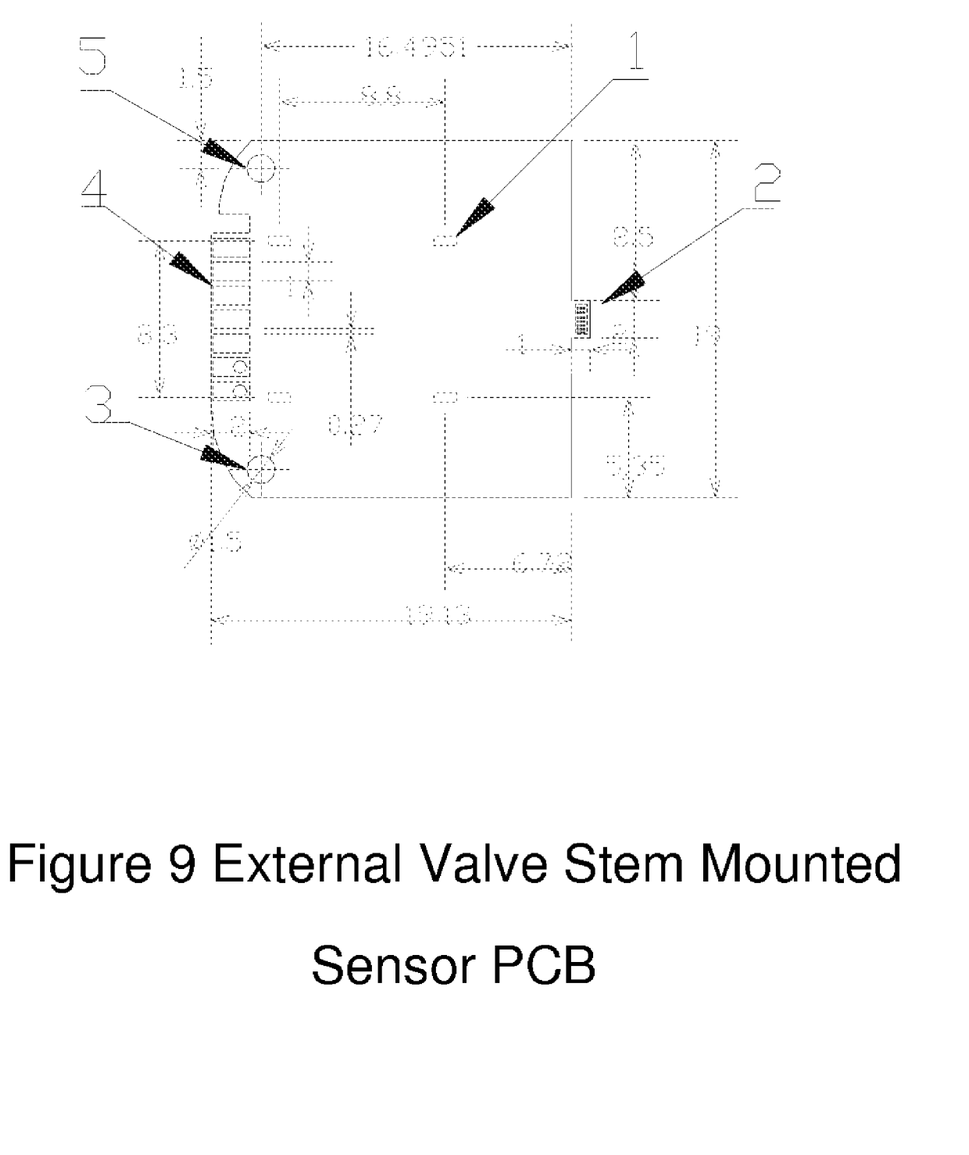
FIG. 9 is a PCB layout depicting the miniature tire pressure valve stem mounted sensor.

Now, referring to FIG. 9, a manufacturing test and program connector 4 is made by PCB 3 layout. And antenna holder solder holes are shown by 3, 4, and 2.

Figure 10:
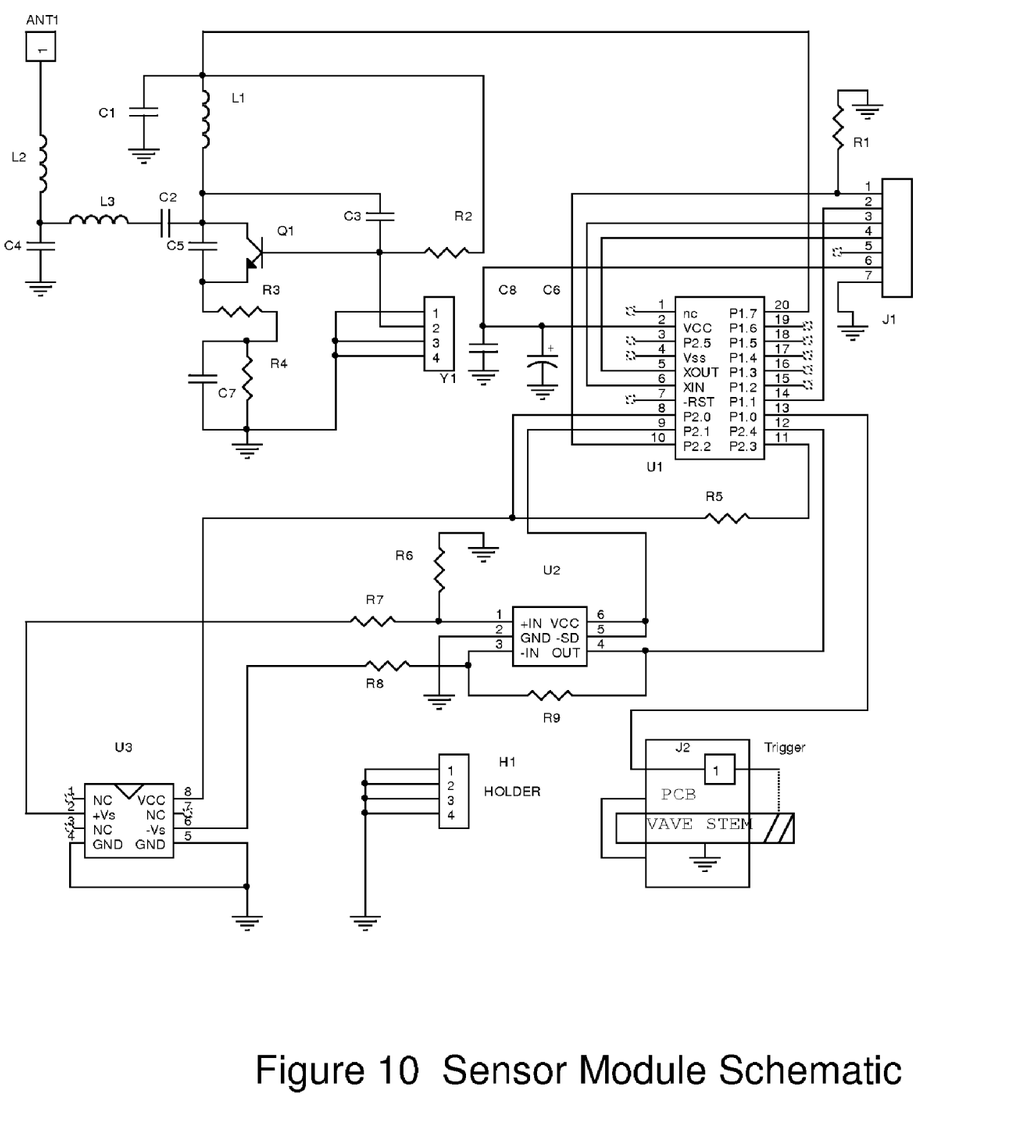
FIG. 10 is a schematic of the tire pressure sensor module.

Referring to FIG. 10, the tire pressure sensor module electronics support sensory logic and transmitter functions. Sensory electronics include a piezo-resistive pressure sensor U3, which comprises four strain resistive sensitive resistors diffused in silicon. These resistors are connected in a Whetstone bridge configuration, whereby two resistors increase resistance with positive pressure while the other two resistors decrease in resistance. When pressure is applied to sensor U3, the resistors in the arms of the bridge of sensor U3 changed resistance by an amount directly proportional to the pressure applied. When a voltage is applied to the bridge, there will be a resulting differential output voltage indicating sensed tire pressure. Since this sensed tire pressure is raw data it needs to be calibrated by a current temperature measurement data. By pulling the sensor bridge high through R5, the R5 and the sensor bridge form a resistive divider which is monitored by the internal ADC through pin p2.0. Since the sensor internal bridge resistance is temperature dependent, the voltage on the sensor divider will change accordingly.

Sensory logic consists of (1) a micro-power amplifier U2 connected to the sensor bridge U3 and to resistors R6 through R9, (2) filter capacitor C6, C8 and (3) another high performance CMOS eight-bit microprocessor U1 processing data, I/O control and power management. The micro-power amplifier U2 conditions the sensed tire pressure voltage signal for input to the on-chip A/D converter of microprocessor U1, as an indication of the tire pressure sensed by sensor U3. The radio frequency transmitter consists of transistor circuit Q1, resistors R2, R3, R4, inductor L1, L2, L3, capacitors C1, C2, C3, C4, C5, and C7, and a SAW resonator Y1 for providing a transmitter frequency signal at 433.92 MHz. The transmitter is modulated by microprocessor U1 at pin p1.7. The p1.1, p2.2 and xout, xin terminals of microprocessor U1 are connected to J1 for manufacture test and programming. Terminal P1.0 is used to receive a trigger signal to force sensor module to transmit. Terminal P2.0 is used to power sensor for pressure reading and also read voltage for U3 during temperature measurement.

For reducing the circuit size, an internal 4 MHz RC oscillator is used to clock microprocessor U1. Terminal P1.7 outputs data to the transmitter for amplitude modulation of the 433.92 MHz radio frequency carrier signal. Under program control, microprocessor U1 outputs an encoded digital message data string for amplitude shift key modulating the carrier signal from the RF transmitter circuit. To minimize power consumption, the tire pressure sensor module operates in a dormant mode and only wakes up several milliseconds to check pressure within every 8 seconds, If there has been a significant pressure change, such as +/−2 PSI, from the previous reading, the sensor module transmits an ASK modulated radio frequency signal to the monitor. The RF message consists of the sensor module ID, tire air pressure value, temperature value, battery level data, and checksum.

Since most external tire pressure monitoring sensors were mounted on the tire valve stem, it is difficult and inconvenient to refill air without the air-flowing-through-sensor capability. Repeat practice of removing sensor to refill air and then reinstall will damage the air sealing O-ring and thereby cause air leak, consequently creating a safety hazard to the user. The introduction of tire pressure monitoring sensor with air-flow-through feature is a key invention to solve this problem. Until now, there is no sufficiently small air-flow-through tire valve stem mounted sensors available. The present invention provided a miniature assembly design for the external air-flow-through tire pressure monitoring sensor.

The above system and methods describe a preferred embodiment using exemplar devices and methods that are subject to further enhancements, improvement and modifications. However, those enhancements, improvements modifications may nonetheless fall within the spirit and scope of the appended claims.

Additional Preferred Embodiments and Scope

The above preferred embodiment illustrated a typical embodiment of the present invention. There are various possibilities with regard to additional embodiments.

Figure 11:
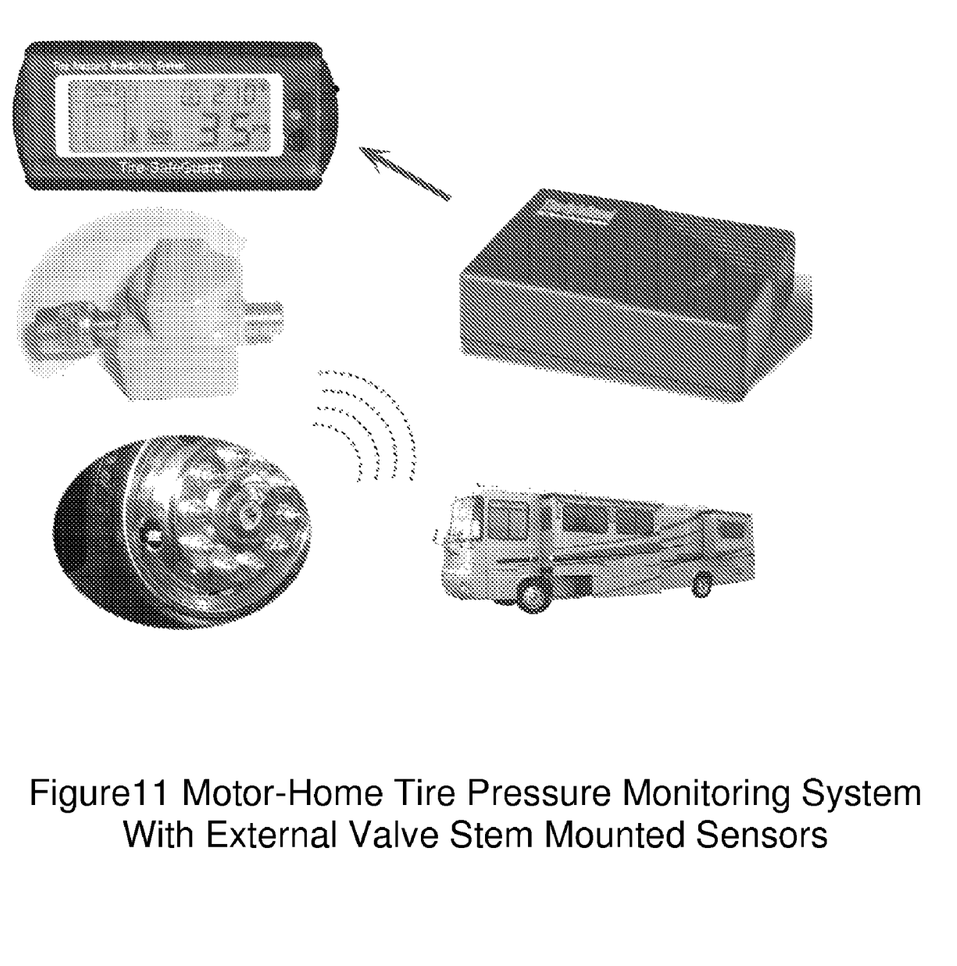
FIG. 11 shows a Motor-Home tire pressure monitoring System with external valve stem mounted sensors.

An additional embodiment for a tire pressure monitoring system can be illustrated with a combination of a monitor unit with tire pressure sensor modules, as shown in FIG. 11.

Although the description above contains much specificity, these should not be construed as limiting the scope of the invention but as merely providing illustrations of some of the presently preferred embodiments of this invention. Thus the scope of the invention should be determined by the following claims and their legal equivalents, rather than by the examples given.

What I claim as my invention is:

1. An external air-flow-through valve stem mounted wireless tire pressure monitoring apparatus comprising:
    (i) a tire valve extender in its interior having a conventional valve core in one end, an internal threaded male valve connector in the other end, an air passageway between the valve core and the connector, such that tire air being flowed into said air passageway after said valve extender being installed on a tire valve stem, said valve extender in its exterior having a rectangular middle section, said rectangular middle section having on one side a hole bored through to the said air passageway, said hole having a rubber air sealing O-ring;
    (ii) an electronic assembly with a combination of print circuit board, control unit, pressure sensor, radio frequency signal transmitter, antenna, and battery being held together by a fixture, said pressure sensor on said electronic assembly being adapted to be mounted on said fixture and being pressed against said O-ring of said hole to form an airtight mating, such that said pressure sensor through said hole being exposed directly to air and associated pressure in said air passageway, said fixture with said electronic assembly being adapted to strap securely on said rectangular middle section of said valve extender;
    (iii) a housing being adapted to contain said tire pressure monitoring apparatus for secure mounting on a tire valve stem.

2. The apparatus of claim 1, wherein said housing is provided with an electrically conductive terminal on the exterior, said terminal is adapted to be connected to said control unit inside said housing, such that an electrical connection between said terminal and said valve extender or ground generates a pull down input trigger signal to said control unit.

3. The apparatus of claim 1, wherein said valve connector of said tire pressure monitoring apparatus is provided with a length extended outside of said housing, said outside length is provided with a left-handed external screw thread, such that said external thread is oriented in the opposite direction of the conventional right-handed tire valve stem external threads; said valve connector is adapted to be associated with a locking apparatus in the form of a tubular and rigid sleeve, said sleeve is provided with a sufficient internal diameter to accommodate enveloping onto a conventional tire valve stem, said sleeve is provided in one side a left-handed internal thread, such that said sleeve can be screwed and tightened onto said left-handed external thread of said valve extender; said sleeve is provided in the other side a plurality of bored-through holes, each said hole is provided with a screw thread and a screw, such that said screw can be driven by a screwdriver into the sleeve with the screw tip pressing the tire valve stem to enable fastening said sleeve with attached tire pressure monitoring apparatus to the tire valve stem.

4. The apparatus of claim 1, wherein said print circuit board with associated electronic components being fixed on said fixture on one side of said rectangular middle section of said valve extender, said battery being fixed on the fixture opposite to the print circuit board on other side of the rectangular middle section, said antenna being fixed on the print circuit board with two antenna connection points being located near opposite print circuit board edges, such that said antenna length in origination being traversed from one connection point and then being traversed crossing the two sides of said rectangular middle section not being covered by battery and print circuit board, and such that said antenna length in termination being traversed to the other connection point on said print circuit board.

5. The system of claim 1, wherein said tire pressure monitoring apparatus further comprises means for determining vehicle motion status, comprising a computer program for a pressure and temperature variation calculation, said pressure and temperature variation being included a collection of vehicle tire pressure and temperature readings over a period of time, said calculation being included computing a rate of said pressure and temperature variation; comprising an data set being included a rate of stationary tire pressure and temperature variations predetermined from an empirical collection of stationary vehicle tire pressure and temperature readings over a period of time; comprising a computer program for vehicle-in-motion assessment, said assessment being included comparison of calculatingly rate of tire pressure and temperature variation against said predetermined rate of stationary tire pressure and temperature variations, said assessment further included comparison to estimated rate of tire pressure and temperature increases caused by a moving vehicle, such that a positive or negative vehicle in motion status can be determined.

6. An external valve stem mounted wireless tire pressure monitoring apparatus comprising an assembly with a combination of print circuit board, control unit, pressure sensor, radio frequency signal transmitter, antenna, battery, valve connector being enclosed in a housing, said valve connector is adapted to being installed on a conventional tire valve stem, said valve connector is provided with a length extended outside of said housing, said outside length is provided with a left-handed external screw thread, such that said external thread is oriented in the opposite direction of the conventional right-handed tire valve stem external threads; said valve connector is adapted to be associated with a locking apparatus in the form of a tubular and rigid sleeve, said sleeve is provided with a sufficient internal diameter to accommodate enveloping onto a conventional tire valve stem, said sleeve is provided in one side a left-handed internal thread, such that said sleeve can be screwed and tightened onto said left-handed external thread of said valve connector; said sleeve is provided in the other side a plurality of bored-through holes, each said hole is provided with a screw thread and a screw, such that said screw can be driven by a screwdriver into the sleeve with the screw tip pressing the tire valve stem to enable fastening said sleeve with attached tire pressure monitoring apparatus to the tire valve stem.

7. An external valve stem mounted wireless tire pressure monitoring apparatus comprising an assembly with a combination of print circuit board, control unit, pressure sensor, radio frequency signal transmitter, antenna, battery, valve connector being enclosed in a housing, said valve connector is adapted to being installed on a conventional tire valve stem, said housing is provided with an electrically conductive terminal on the exterior, said terminal is adapted to be connected to said control unit inside said housing, such that an electrical connection between said terminal and said valve extender or ground generates a pull down input trigger signal to said control unit.

8. An external valve stem mounted wireless tire pressure monitoring apparatus comprising an electronic assembly and a tire valve extender being enclosed in a housing, said tire valve extender in its interior having a conventional valve core in one end, an internal threaded male valve connector in the other end, an air passageway between the valve core and the connector, such that tire air being flowed into said air passageway after said valve extender being installed on a conventional tire valve stem, said valve extender in its exterior having on one side a hole bored through to the said air passageway, said hole having a rubber air sealing O-ring; said electronic assembly with a combination of print circuit board, control unit, pressure sensor, radio frequency signal transmitter, antenna, and battery being held together by a fixture, said pressure sensor on said electronic assembly being adapted to be mounted on said fixture and being pressed against said O-ring of said hole to form an airtight mating, such that said pressure sensor through said hole being exposed directly to air and associated pressure in said air passageway, said fixture with said electronic assembly being adapted to strap securely on said valve extender; said housing being adapted to contain said tire pressure monitoring apparatus for secure mounting on a tire valve stem.

* * * * *